United States Patent [19]
Sato

[11] 4,082,663
[45] Apr. 4, 1978

[54] METHOD OF POSITIONING A FILTER CAKE DISCHARGE DEVICE FOR A FILTER PRESS

[75] Inventor: Nobuo Sato, Nagoya, Japan
[73] Assignee: NGK Insulators, Ltd., Japan
[21] Appl. No.: 754,842
[22] Filed: Dec. 27, 1976
[30] Foreign Application Priority Data
Jan. 7, 1976    Japan ................................. 51-1737
[51] Int. Cl.² ............................................. B01D 23/24
[52] U.S. Cl. ......................................... 210/79; 55/96; 210/91
[58] Field of Search .................... 210/79, 91, 143, 407, 210/224, 225, 65, 227, 231; 55/96, 272, 304

[56] References Cited
U.S. PATENT DOCUMENTS

| | | | |
|---|---|---|---|
| 3,331,511 | 7/1967 | Kurita | 210/230 |
| 3,622,005 | 11/1971 | Kurita | 210/225 |
| 3,724,663 | 4/1973 | Gwilliam | 210/143 X |

*Primary Examiner*—William A. Cuchlinski, Jr.
*Attorney, Agent, or Firm*—Stevens, Davis, Miller & Mosher

[57] ABSTRACT

A method of positioning a filter cake discharge device for a filter press, which is mostly a vibrating device or vibrator for vibrating a filter cloth between opened filter plates. The relative position of the vibrating device with respect to the filter plates is determined by utilizing each signal from a switch provided on the discharge device for detecting a position of the vibrating device and other switches provided on the discharge device for detecting a condition of the filter plates. These switches are operated by protrusions provided on the top end of the filter plates.

3 Claims, 7 Drawing Figures

METHOD OF POSITIONING A FILTER CAKE DISCHARGE DEVICE FOR A FILTER PRESS

BACKGROUND OF THE INVENTION

1. Field of the Invention

This invention relates to a filter press and more particularly to a method of positioning a filter cake discharge device for a filter press.

2. Background of the Invention

In order to discharge filter cakes of a filter press, heretofore, when filter plates are separately opened one by one after completion of a pressing, a filter cake discharge device is moved about the filter plates in the closing and opening direction thereof until it reaches the mid portion of a filter cloth or plates to remove the cakes therefrom by vibrating the filter cloth or jetting cleaning liquid thereagainst. Such a filter press is disclosed in application Ser. No. 679,439 filed on Apr. 22, 1976 now abandoned. With this arrangement the filter plates often assume a tilted position during opening or when stopped due to an old or worn filter cloth, clogged clakes at the bottom of the filter plates used for many years, or any slacks in a shifting mechanism for the filter plates. If a cake discharging operation is effected with the tilted filter plate, there is a risk of damage to the filter cloth or plate and a complete discharge of filter cakes cannot be accomplished because the filter cake discharge device is not in the best position for discharging the cakes.

Particularly, with a heretofore known filter press wherein filter plates and filter cake discharge device are connected with each other by a chain in order to drive these members by a single driving means, there is a tendency for open positions of the filter plates to be shifted owing to an elongation of the chain. It is evident that such an incorrect positioning of the filter plates will obstruct the complete discharge of the filter cakes.

SUMMARY OF THE INVENTION

To avoid the above problems in the prior art, the method of positioning a filter cake discharge device for a filter press travelling above filter plates in a moving direction of said filter plates according to the invention, comprises determining a relative position of said filter cake discharge device with respect to the filter plates by utilizing each signal from a switch provided on said discharge device for detecting a position of said filter cake discharge device and a pair of switches provided on said discharge device for detecting a condition of said filter plates, wherein the switches are operated by protrusions provided on the top end of the filter plates.

It is a primary object of this invention to provide a method of positioning a filter cake discharge device in order to enable a filter press to effect a complete discharge of filter cakes.

It is another object of this invention to avoid a damaging of filter plates and cloth by a filter cake discharge device.

It is further object of this invention to provide a method of operating a filter cake discharge device only when the device is in a proper position relative to filter plates of a filter press.

DETAILED DESCRIPTION OF THE INVENTION

Figure 1:
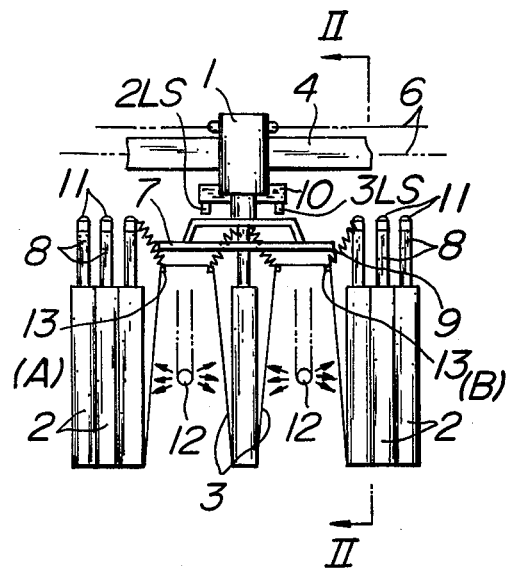
FIG. 1 is a side elevation of a part of a filter press for carrying out the method of the invention.

The term "filter cake discharge device" used herein is intended to include all means for discharging filter cakes such as a vibrating means or vibrator for vibrating filter cloths and cleaning means for jetting cleaning liquid against filtering cloths or plates. The term "forward" used therein means a forward or closing direction of the filter plate, which is indicated by "A" and the term "rearward" means a rearward direction of the plate opposite to the "forward," which is indicated by "B" in FIGS. 1 and 5.

The preferred embodiment of the invention will be explained in detail with reference to the attached drawings hereinafter.

Referring to FIGS. 1–4 wherein two filter cloths are exposed at two different portions in an inverted V-shaped form to discharge the cakes at the portions of the cloths, the vibrating means 1 is movable along a rail 4 arranged in the forward and rearward directions of the filter plates with the aid of rollers 5 rolling on the rail 4 and is driven by an endless chain 6 attached at its ends to the vibrating means 1. The vibrating means 1 comprises a hammer 7 vertically or circularly movable to vibrate the filter cloth 3. In the embodiment, a pair of vibrating means 1 are provided (only one shown in FIG. 2) and moved in synchronism with each other and two rails 4 for respective vibrating means arranged one on each side of a filter press. The filter plates 2 are adapted to be opened by means of a suitable shifting mechanism, for example, shifting pawls adapted to engage projections on the filter plates 2 and secured to driving chains extending in parallel with side bar of the filter press. Each of the filter plates 2 is provided at both ends of its upper surface with inverted L-shaped frames 8 (only one shown in FIG. 2) from which are hung springs 9 for holding iron rods 13 somewhat larger than the width of the cloth 3 for supporting 1.

Figure 2:
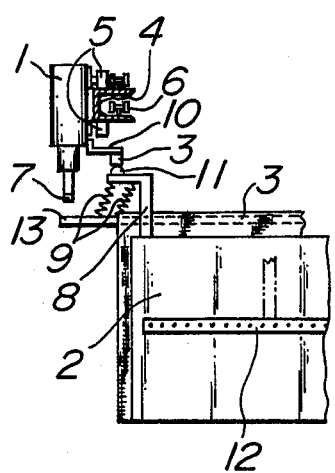
FIG. 2 is a sectional view taken along the lines II—II in FIG. 1.

The vibrating means or vibrator 1 on one side is provided with a mounting member 10 having a position limit switch 1₁LS (switch for detecting a relative position of the vibrating means to the filter plates) at the mid portion of the underside of the member and condition limit switches 2LS, 3LS (switches for detecting conditions of the filter plates) at both ends of the underside of the member. The vibrating means on the other side is similarly provided with a mounting member 10 having a position limit switch 1₂LS at the mid portion of the underside. On the other hand, each of the frames 8 is provided on its top with a protrusion 11 for actuating levers of the respective limit switches 1₁LS, 1₂LS, 2LS and 3LS (FIGS. 1 and 2).

Figure 4:
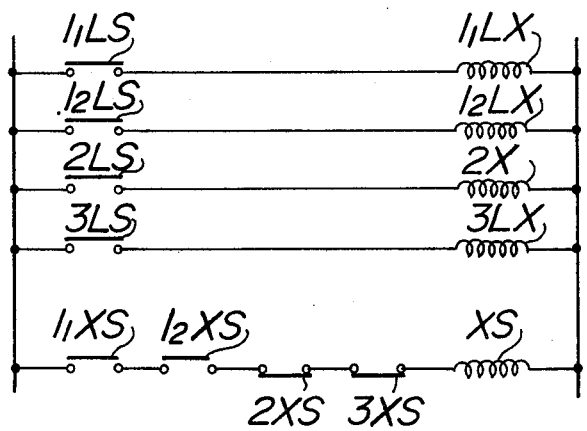
FIG. 4 is an operating circuit for the cake discharge device in FIG. 1.

Referring to FIG. 4 showing an operating circuit for the method according to the invention, when the limit switches $1_1LS$ and $1_2LS$ are actuated, electromagnetic relay coils $1_1LX$ and $1_2LX$ are energized to close normal open contacts $1_1XS$ and $1_2XS$, respectively. When the limit switches 2LS and 3LS are actuated, electromagnetic relay coils 2LX and 3LX are energized to open normally closed contacts 2XS and 3XS, respectively. If both the normally open contacts $1_1XS$ and $1_2XS$ are closed while the normally closed contacts 2XS and 3XS remain normally closed, an electromagnetic relay coil XS for starting vibration is energized to produce a signal for starting vibration of the hammers 7. It is preferable to provide a lamp or alarm which is actuated when the coils 2LX and 3LX are energized.

Figure 3:
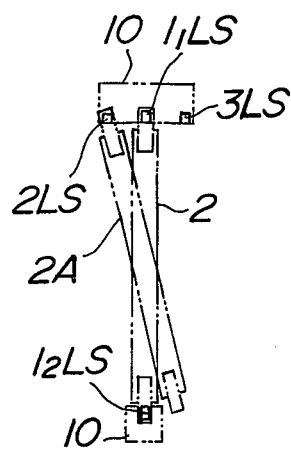
FIG. 3 is a fragmentary view of the filter press in FIG. 1 showing arrangements of limit switches.

In order to discharge the cakes with the above arrangement, the rearmost filter plate of the gathered filter plates 2 is opened rearwardly by means of the shifting mechanism and the second rearward plate is then opened such that the distances between the rearmost and second filter plates and between the second and third filter plates are equal. In this manner, the filter cloth is pulled by the forward and rearward springs 9 so that the filter cloths are oblique or tilted between the adjacent spaced apart filter plates and the upper portion extends horizontally in an inverted V-shaped form as shown in FIG. 1. On the other hand, the vibrating means 1 which have been located at the rearward position of the filter plates are advanced simultaneously with the rearward movement of the filter plates 2 until they reach a position intermediate the rearmost and third filter plates that is above the second filter plate as shown in FIG. 1. In this case so long as the second plate is vertically positioned or at right angles to the closing direction of the plates and the vibrating means 1 are immediately above the second plate as shown in FIG. 1, the limit switches $1_1LS$ and $1_2LS$ are actuated to energize the coil XS for starting the vibration of the hammers 7 of the vibrating means. If the second filter plate 2A were inclined as shown in FIG. 3, the vibration would not start because the limit switch 2LS is actuated to open the contacts 2XS so that the coil XS is not energized. In order to detect the inclined filter plate, it is preferable to provide an alarm adapted to be actuated when the coil 2LX is energized. When the inclined plate 2A (FIG. 3) is detected by the alarm, the vibration may be started after the second plate has been returned to its vertical position. In the event that the second plate was inclined to actuate the limit switch 3LS, or in the event that the vibrating means 1 did not stop at the proper position immediately above the second plate to actuate the limit switch 2LS or 3LS, it makes the contact 3XS open so that the coil XS is not energized and the vibration does not start in the same manner as the above.

After the parts of the filter cloth between the rearmost, second and third filter plates have been cleaned, these plates are retracted in succession in the rearward position and then the fourth filter plate is opened and the vibrating means 1 are further advanced to effect the same operation for cleaning the next parts of the filter cloth between the third, fourth and fifth filter plates the operation is repeated for the remaining parts of the filter cloth.

So long as one of the vibrating means has the limit switch $1_1LS$, the same switch $1_2LS$ for the other vibrating means is not necessarily essential. However, the condition limit switch may be provided together with the limit switch $1_2LS$ for the other vibrating means.

In the case where a cleaning means for jetting cleaning liquid is used, the control and operation of the device are the same as those of the vibrating means although the constructions of these discharging devices are quite different from each other. Dot-dash lines 12 in FIGS. 1 and 2 indicate jet nozzles of the cleaning means.

Figure 5:
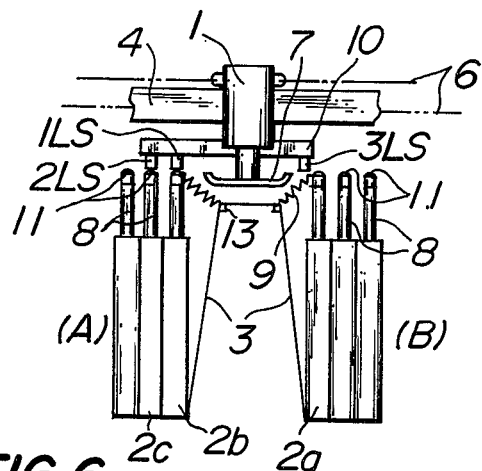
FIG. 5 is a side elevation of a part of another filter press for carrying out the method of the invention.
Figure 6:
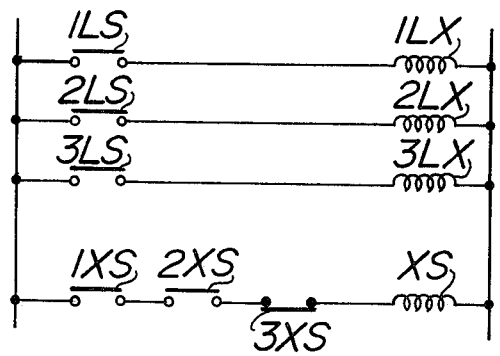
FIG. 6 is an operating circuit for the cake discharge device in FIG. 5.

FIG. 5 illustrates another embodiment of the invention and FIG. 6 shows a control circuit therefor wherein only one filter cloth at a time is exposed in an inverted V-shaped form for discharging the cakes between the two filter plates. In this case, the configuration of a mounting member 10 and positions of limit switches 1LS, 2LS and 3LS are different from those in the embodiment shown in FIGS. 1 to 4. The mounting member 10 in this embodiment has a length substantially equal to the distance between opened filter plates 2a and 2b. The limit switch 3LS of vibrating means 1 is so positioned on the mounting member 10 that when the vibrating means 1 is located in the proper position relative to the filter plates the limit switch 3LS is at a location nearer to the vibrating means than a protrusion 11 of the filter plate 2a which is rearwardly spaced from the adjacent filter plate 2b. The limit switch 1LS is so arranged on the mounting member as to be in contact with a protrusion 11 of the filter plate 2b which is forwardly spaced from the rearward filter plate 2a. The limit switch 2LS is so located on the mounting member as to be in contact with a protrusion 11 of a filter plate 2c firmly pressed to the filter plate 2b.

The operation circuit shown in FIG. 6 is different from the circuit shown in FIG. 4 in the fact that contacts 2XS are normal open contacts adapted to open and close by means of a coil 2LX energized when the limit switch 2LS is actuated.

With the above arrangement, the coil XS is energized to start the vibration only when the vibrating means 1 are just centrally above the filter plates 2a and 2b spaced a determined distance, the filter plates 2b and 2c are in close contact with each other and the filter plates 2a, 2b and 2c assume in their proper positions at right angles to the advancing direction of the plates. When the vibrating means and the filter plates do not fulfill these conditions, the vibration will never be started.

Figure 7:
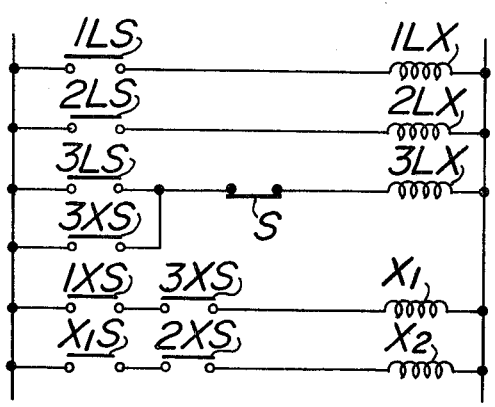
FIG. 7 is another circuit for the cake discharge device in FIG. 5.

Referring to FIG. 7 showing another operating circuit for the limit switches 1LS, 2LS and 3LS shown in FIG. 5, the circuit including the limit switch 3LS is a self holding circuit having normal open contacts 3XS connected in parallel with the limit switch 3LS and adapted to be closed when the coil 3LX is energized; normally closed contacts S connected in series with the switch 3LS are for releasing the self hold. The contacts S are opened by a signal indicating the start of a motor for driving the shifting mechanism for the filter plates. Normal open contacts 1XS and 3XS adapted to be closed when coils 1LS and 3LS are energized, respectively and are connected in series with a electromagnetic relay coil $X_1$ for detecting the passage of the filter plates. Normally open contacts $X_1S$ adapted to be closed when the coil $X_1$ is energized and normally open contacts 2XS adapted to be closed when the coil 2LX is energized are connected in series with an electromagnetic relay coil $X_2$ for starting the vibration.

Accordingly, with this operating circuit, after completion of the cake discharging operation, the opening of the forward filter plate, for example, the plate 2b of the adjacent spaced filter plates is detected by the energization of the coil $X_1$, and thereafter the energization of the coil $X_2$ indicates the fact that the vibrating means 1 is in the proper position and the respective filter plates are in the determined location for the discharge of the cakes.

As can be seen from the above description, according to the invention the discharge of cakes is completely accomplished without any risk of damage to the filter cloths and plates by the detection of the fact that the filter plates and the cake discharging device are in proper position for discharging cakes.

What is claimed is:

1. A method of positioning a filter cake discharge device for a filter press travelling above filter plates in a moving direction of said filter plates, comprising determining a relative position of said filter cake discharge device with respect to said filter plates by utilizing each signal from a switch provided on said discharge device for detecting a position of said filter cake discharge device and a pair of switches provided on said discharge device for detecting a condition of said filter plates, wherein said switches are operated by protrusions provided on the top end of said filter plates.

2. A method as set forth in claim 1, further controlling operation of said filter cake discharge device by utilizing the signal from said pair of switches for detecting the condition of the filter plates.

3. A method as set forth in claim 2, further including positioning and operating said filter cake discharge device only when the switch for detecting the position of the discharge device is ON and both the pair of switches for detecting the condition of the filter plates are OFF.

* * * * *